(12) United States Patent
Ono et al.

(10) Patent No.: US 12,043,184 B2
(45) Date of Patent: Jul. 23, 2024

(54) ONBOARD DEVICE AND ATTACHMENT STRUCTURE FOR ONBOARD DEVICE

(71) Applicant: JVCKENWOOD Corporation, Yokohama (JP)

(72) Inventors: Fumiaki Ono, Yokohama (JP); Koichi Yoshizawa, Yokohama (JP); Yoichi Nakano, Yokohama (JP); Yukihiro Katsuragi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 396 days.

(21) Appl. No.: 17/540,714

(22) Filed: Dec. 2, 2021

(65) Prior Publication Data

US 2022/0089104 A1    Mar. 24, 2022

Related U.S. Application Data

(63) Continuation of application No. PCT/JP2020/018414, filed on May 1, 2020.

(30) Foreign Application Priority Data

Jun. 6, 2019  (JP) .................................. 2019-106311
Jun. 6, 2019  (JP) .................................. 2019-106315
Jun. 6, 2019  (JP) .................................. 2019-106316

(51) Int. Cl.
*H05K 5/00*     (2006.01)
*B60R 1/22*     (2022.01)
(Continued)

(52) U.S. Cl.
CPC ................ *B60R 11/04* (2013.01); *B60R 1/22* (2022.01); *F16M 13/02* (2013.01);
(Continued)

(58) Field of Classification Search
CPC ....................................................... H05K 7/00
See application file for complete search history.

(56) References Cited

FOREIGN PATENT DOCUMENTS

| JP | 8-160874 A | 6/1996 |
|---|---|---|
| JP | 2001215640 A | 8/2001 |

(Continued)

OTHER PUBLICATIONS

Office Action issued on Nov. 25, 2023 for application No. CN202080040744.X.

*Primary Examiner* — Jerry Wu
(74) *Attorney, Agent, or Firm* — Nath, Goldberg & Meyer; Jerald L. Meyer

(57) ABSTRACT

An onboard device includes a body member, a support member projecting from the body member and including a base to be attached to a concave inner surface of a glass member having a curved shape provided in a vehicle, and a double-sided adhesive tape stuck on a the base. The base is a plate-like member including an attachment surface to be opposed to the inner surface of the glass member. The attachment surface is a curved surface having a curvature at least in a first direction along the attachment surface. The double-sided adhesive tape is provided with at least one first slit open toward an upper edge located on the upper side and cut downward and at least one second slit open toward a lower edge located on the lower side and cut upward when the base (3) is attached to the inner surface.

10 Claims, 9 Drawing Sheets

(51) Int. Cl.
  *B60R 11/04*     (2006.01)
  *F16M 13/02*     (2006.01)
  *G07C 5/08*      (2006.01)
  *H04N 23/51*     (2023.01)
  *H04N 23/53*     (2023.01)
  *B60R 11/00*     (2006.01)

(52) U.S. Cl.
  CPC ........... *G07C 5/0866* (2013.01); *H04N 23/51* (2023.01); *H04N 23/53* (2023.01); *H05K 5/0017* (2013.01); *B60R 2011/0026* (2013.01); *B60R 2011/0077* (2013.01)

(56) References Cited

FOREIGN PATENT DOCUMENTS

| | | |
|---|---|---|
| JP | 2005-20723 A | 1/2005 |
| JP | 2006134453 A | 5/2006 |
| JP | 2007069824 A | 3/2007 |
| JP | 2007112377 A | 5/2007 |
| JP | 2014074173 A | 4/2014 |
| JP | 5646924 B2 | 11/2014 |
| JP | 2016177188 A | 10/2016 |
| JP | 2017182657 A | 10/2017 |
| JP | 2018114878 A * | 7/2018 |
| JP | 2018114878 A | 7/2018 |
| JP | 2018116722 A | 7/2018 |
| WO | 2009116692 A1 | 9/2009 |

\* cited by examiner

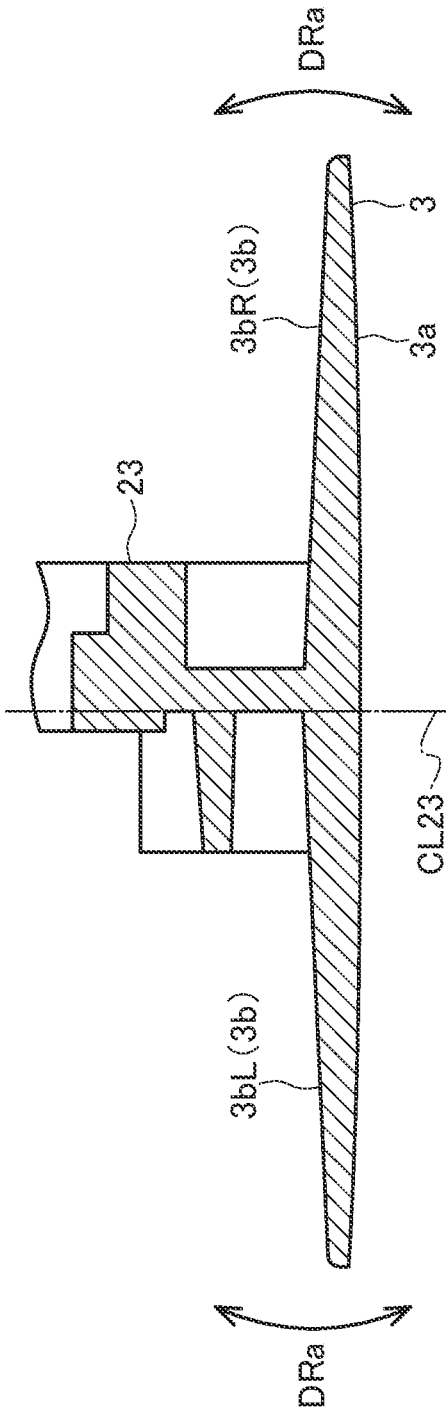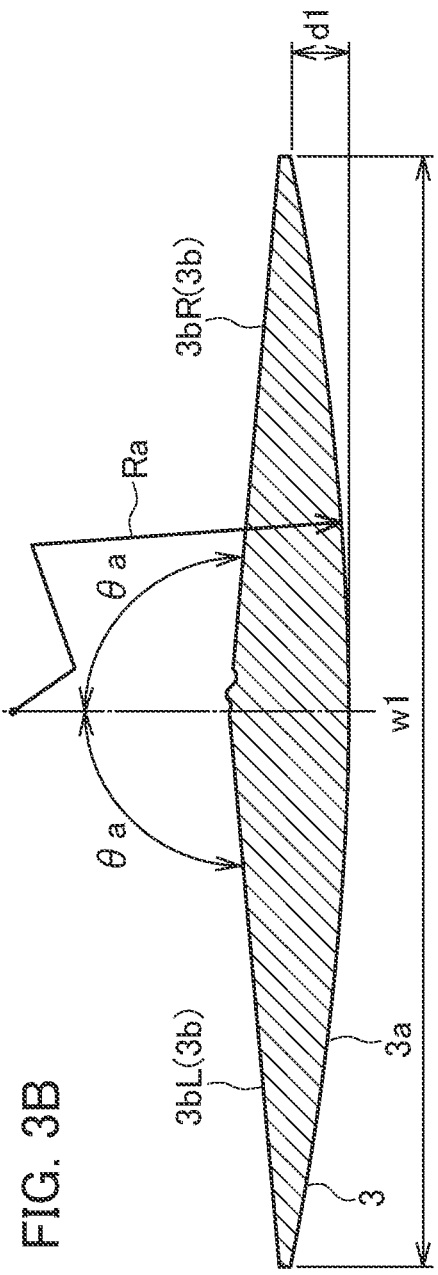

ONBOARD DEVICE AND ATTACHMENT STRUCTURE FOR ONBOARD DEVICE

CROSS REFERENCE TO RELATED APPLICATION

This application is a Continuation of PCT Application No. PCT/JP2020/018414, filed on May 1, 2020, and claims the priority of Japanese Patent Application No. 2019-106311, filed on Jun. 6, 2019, Japanese Patent Application. No. 2019-106315, filed on Jun. 6, 2019, and Japanese Patent Application No. 2019-106316, filed on Jun. 6, 2019, the entire contents of all of which are incorporated herein by reference.

BACKGROUND

The present disclosure relates to an onboard device and an attachment structure for an onboard device.

Onboard devices are known that are attached on the inner surface of a windshield of a vehicle via a double-sided adhesive tape. JP 5646924 discloses a drive recorder as an example of such an onboard device.

The drive recorder disclosed in JP 5646924 is attached to the windshield such that a stuck surface of a projection projecting from a body member of the drive recorder is stuck on the inner surface of the windshield with a double-sided adhesive tape.

While the stuck surface on the onboard device side is a flat surface, the inner surface of the windshield of the vehicle is typically a concave surface. The double-sided adhesive tape to be used is thick and usually has a thickness of about 2 to 3 mm, so that a difference in the compression amount of the thick double-sided adhesive tape absorbs a distance difference caused between the curved inner surface of the windshield and the stuck surface of the onboard device.

JP 5646924 also discloses in paragraph [0067] that the stuck area of the projection is decreased so as to enable the attachment of the drive recorder to the windshield without being influenced by the curve of the windshield.

However, the use of the thick doubled-sided adhesive tape increases the cost. In addition, since the compression amount is large at the edge of the stuck surface but is small in the middle part of the stuck surface, a space may be caused in the middle part of the stuck surface not stuck on the windshield, which decreases the attachment strength.

The adhesive strength with respect to the moment applied to the stuck part is decreased as the stuck area is smaller. The conventional technique thus needs to use the double-sided adhesive tape having higher adhesive force so as to ensure the sufficient attachment strength, leading to an increase in cost accordingly.

When the stuck surface of the projection that is the flat surface is stuck on the curved surface of the windshield with the double-sided adhesive tape interposed therebetween, air bubbles tend to remain on the stuck surface after the sticking operation. The air bubbles remaining on the stuck surface decrease the stuck area to lead to a decrease in the adhesive strength, and are thus required to be eliminated as much as possible. This issue is also applied to the double-sided adhesive tape having a greater thickness.

The double-sided adhesive tape adhering to the inner surface of the windshield sometimes needs to be removed in order to detach the onboard device for replacement, for example. When the double-sided adhesive tape is removed from the windshield, a thin flathead screwdriver is usually forced into the stuck part, and is then lifted up so as to remove the double-sided adhesive tape. However, since the double-sided adhesive tape strongly adheres to the windshield with no gap, the flathead screwdriver cannot be easily forced into the stuck part, which impedes the easy detachment of the onboard device.

SUMMARY

A first aspect of one or more embodiments provides an onboard device including: a body member; a support member projecting from the body member and including a base to be attached to a concave inner surface of a glass member having a curved shape provided in a vehicle; and a double-sided adhesive tape prepared to be stuck on the base, wherein the base of the support member is a plate-like member including an attachment surface to be opposed to the inner surface of the glass member and a pillar-part formation surface provided with a pillar part connected to the body member on an opposite side of the attachment surface, the attachment surface is a curved surface having a curvature at least in a first direction along the attachment surface and projecting toward an opposite side of the pillar-part formation surface, and the double-sided adhesive tape is provided with a plurality of slits including at least one first slit open toward an upper edge located on an upper side when the base is attached to the inner surface and cut downward in a direction perpendicular to an axial line about which the base is rotated when attached to the inner surface, and at least one second slit open toward a lower edge located on a lower side and cut upward in the direction perpendicular to the axial line about which the base is rotated when attached to the inner surface.

A second aspect of one or more embodiments provides an attachment structure for an onboard device including: a body member; a support member projecting from the body member and including a base to be attached to a concave inner surface of a glass member having a curved shape provided in a vehicle; and a double-sided adhesive tape prepared to be stuck on the base and the inner surface so as to attach the support member to the glass member, wherein the double-sided adhesive tape is provided with a plurality of slits including at least one first slit open toward an upper edge located on an upper side when the base is attached to the inner surface and cut downward in a direction perpendicular to an axial line about which the base is rotated when attached to the inner surface, and at least one second slit open toward a lower edge located on a lower side and cut upward in the direction perpendicular to the axial line about which the base is rotated when attached to the inner surface.

BRIEF DESCRIPTION OF THE DRAWINGS

FIG. 3A is a cross-sectional view taken along line S3-S3 in FIG. 2.

FIG. 3B is a view partly exaggerating the dimensions illustrated in FIG. 3A.

DETAILED DESCRIPTION

An onboard device according to an embodiment is illustrated below with a drive recorder 91 according to an example.

EXAMPLE

Figure 1:
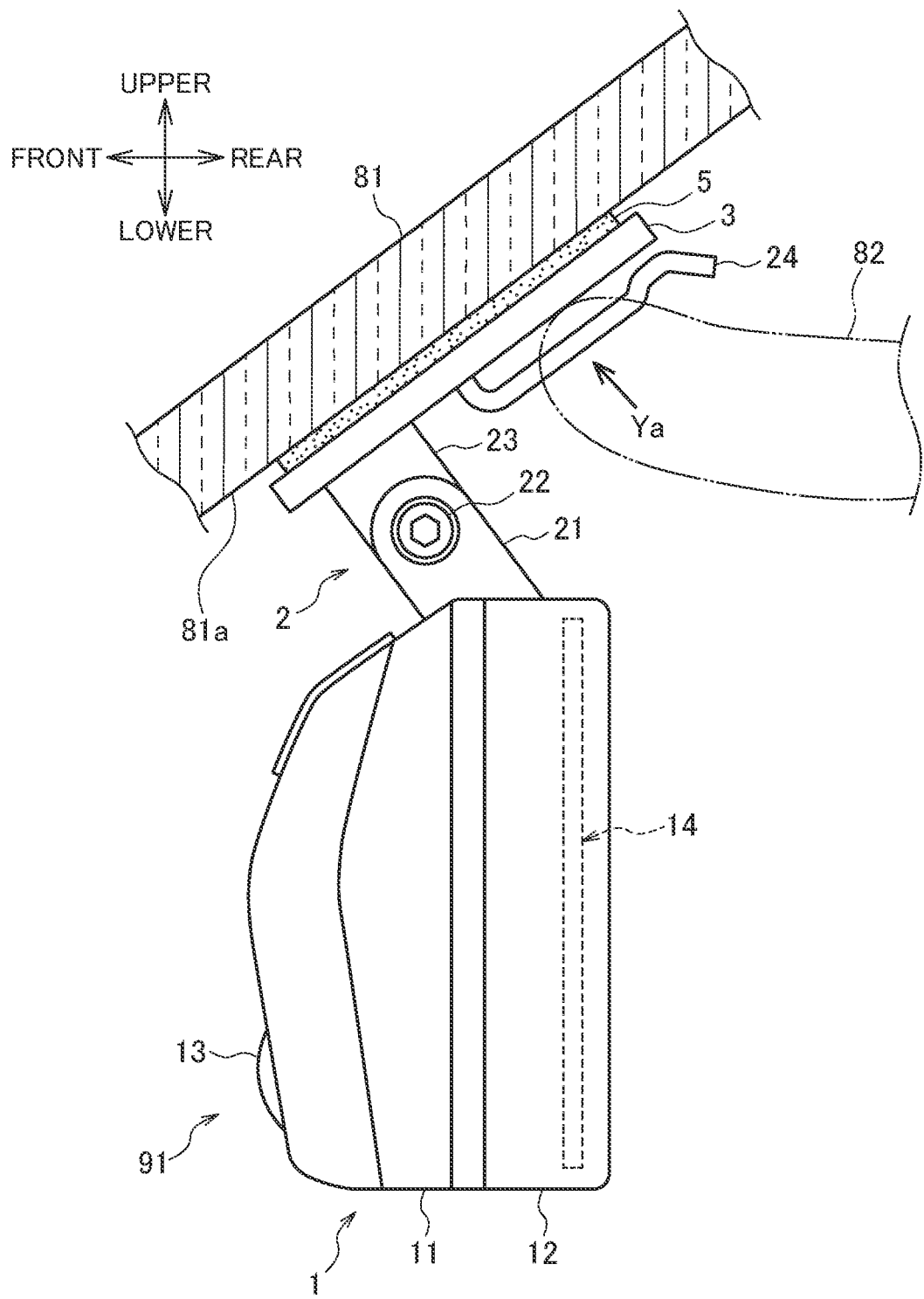
FIG. 1 is a side view illustrating a state in which a drive recorder 91 as an example of an onboard device according to an embodiment is attached to a windshield 81.

FIG. 1 is a side view illustrating an attachment state in which the drive recorder 91 is attached to an inner surface 81a of a windshield 81 that is a glass member of a vehicle, for example. The respective upper, lower, front, and rear directions are indicated by the arrows based on the attitude of the vehicle. The right and left directions are the front and back directions of the surface of the drawing. The windshield 81 has a curved shape in which the inner surface 81a is concave.

The drive recorder 91 includes a body member 1 having a cuboidal shape with a slightly longer length in the right and left direction, and a support member 2 projecting in a diagonally front-upper direction from a front-upper part of the body member 1.

The body member 1 includes a camera unit 13 on the front surface, and an image display unit 14 on the rear surface.

The camera unit 13 captures images through the glass member, and the image display unit 14 displays the images captured by the camera unit 13.

The support member 2 includes an arm part 21, a pillar part 23, a base 3, and a double-sided adhesive tape 5 as an adhesive member.

The arm part 21 projects from the body member 1, and the pillar part 23 is rotatably engaged with the arm part 21 about an axial line extending in the right-left direction and locked at a predetermined rotational angle at the arm part 21 by fastening of a nut 22. This configuration can bring the body member 1 to an intended swing attitude in the upper-lower direction with respect to the windshield 81.

Figure 2:
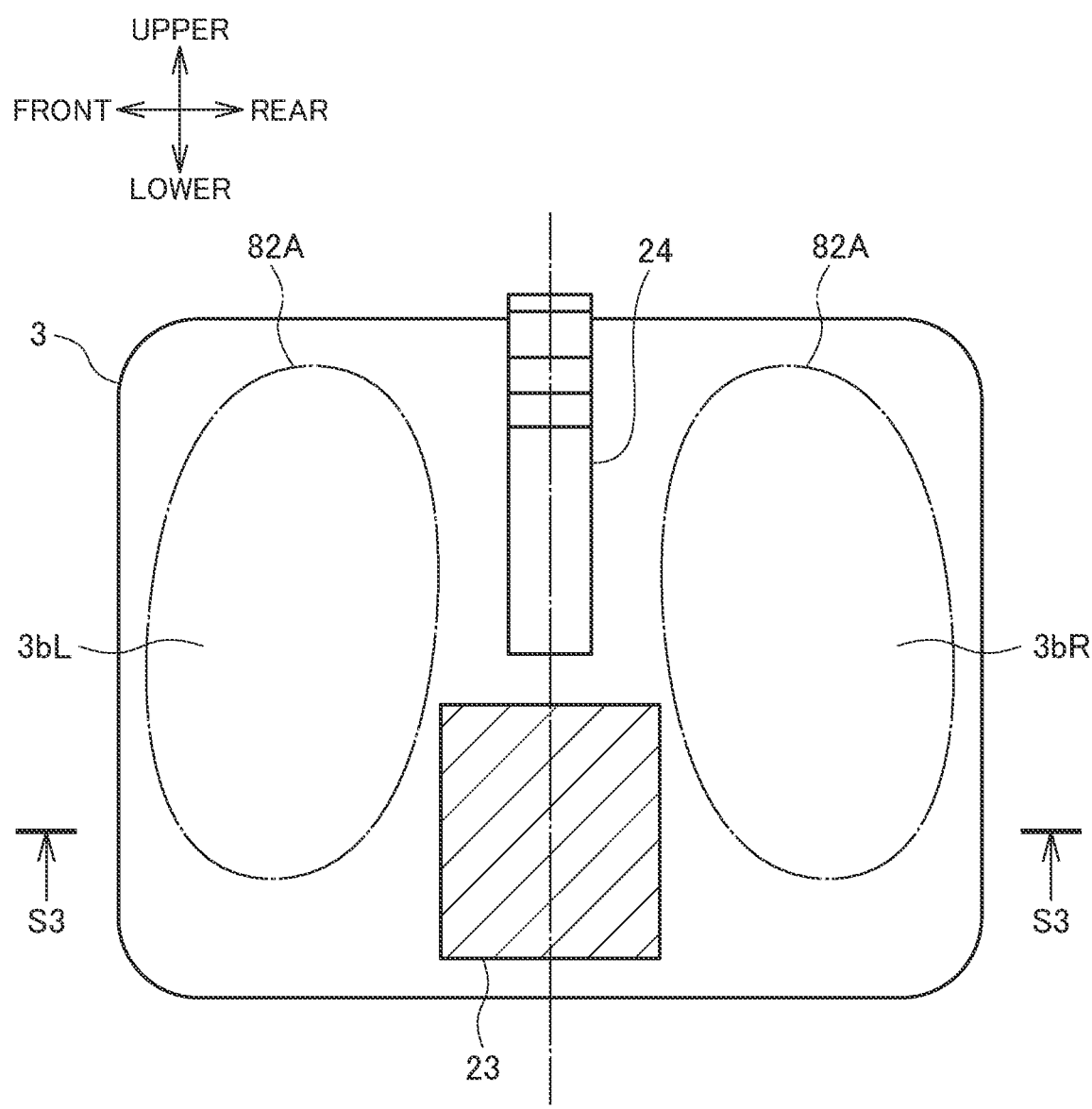
FIG. 2 is a view illustrating a base 3 of the drive recorder 91 as viewed in a direction indicated by the arrow Ya in FIG. 1.

FIG. 2 is a view illustrating the base 3 as viewed in a direction indicated by the arrow Ya in FIG. 1. FIG. 2 illustrates only the fundamental outline of the pillar part 23.

As illustrated in FIG. 2, the base 3 is a plate-like member having a substantially rectangular shape integrated with the pillar part 23 connected to the body member 1, and includes a cable hook 24 for hooking a cable (not illustrated) connecting the body member 1 to an external device.

FIG. 3A is a cross-sectional view taken along line S3-S3 in FIG. 2. Namely, FIG. 3A illustrates the base 3 cross-sectioned along the middle of the pillar part 23 in the right-left direction. FIG. 3B is a view partly exaggerating the dimensions of the shape illustrated in FIG. 3A.

The base 3 is formed of resin into a plate shape having an attachment surface 3a and an inclination surface 3b serving as a pillar-part formation surface provided with the pillar part 23 on the opposite side of the attachment surface 3a.

The base 3 is formed of resin to have a rectangular shape in a planar view, for example.

The attachment surface 3a, to which the double-sided adhesive tape 5 is stuck, is opposed to the windshield 81.

As illustrated in FIG. 3A and FIG. 3B, the attachment surface 3a is a curved surface projecting most in the middle in the right-left direction that is a first direction. The curved surface is a circumferential surface of a cylinder having a curvature of zero in the upper-lower direction and having a radius Ra in the right-left direction. The attachment surface 3a may be a curved surface having a curvature in both the upper-lower direction and the right-left direction.

The radius Ra is set to be approximate to a curvature in the right-left direction in the typical windshield 81 around to the upper part in the middle in the right-left direction at which the onboard device is attached. The radius Ra is set to 961, for example.

A distance d1, which is a projecting amount in the middle part of the attachment surface 3a with respect to the right and left ends, is set to about 0.4 mm, for example.

As illustrated in FIG. 3A, the pillar part 23 projects upward substantially in the middle in the right-left direction of the inclination surface 3b. The part of the inclination surface 3b on the left side based on the pillar part 23 is referred to below as an inclination surface 3bL, and the part of the inclination surface 3b on the right side is referred to below as an inclination surface 3bR.

The inclination surface 3bL and the inclination surface 3bR are inclined with respect to the plane surface perpendicular to the axial line CL23 of the pillar part 23. In particular, the respective inclination surfaces are inclined in the direction closer to the attachment surface 3a as the respective inclination surfaces are separated from the pillar part 23 in the respective right and left directions.

An angle θa between the respective inclination surfaces and the axial line CL23 of the pillar part 23 in FIG. 3B is thus greater than 90 degrees. The angle θa in this case is 94 degrees, for example.

The inclination surface 3bL and the inclination surface 3bR are each illustrated with the flat surface in this example, but may be a curved surface instead.

The configuration of the inclination surface 3bL and the inclination surface 3bR described above leads the base 3 to have a smaller thickness (to be thinner) as the base 3 is separated from the pillar part 23 in the respective right and left directions.

The thickness is set to a degree so that the base 3 can be bent and deformable in the thickness direction due to the pressing force by fingers in the thickness direction, as indicated by the arrows DRa shown in FIG. 3A.

The attachment surface 3a is provided with the double-sided adhesive tape 5 stuck thereto as an adhesive member. The double-sided adhesive tape 5 is shipped in a state in which one of the surfaces is stuck on the attachment surface 3a during the manufacture of the drive recorder 91. The double-sided adhesive tape 5, of course, may be packed with the product upon the shipping so as to allow a buyer or a dealer of the drive recorder 91 to stick the double-sided adhesive tape 5 to the base 3 when attaching the drive recorder 91 to the windshield 81.

Figure 4:
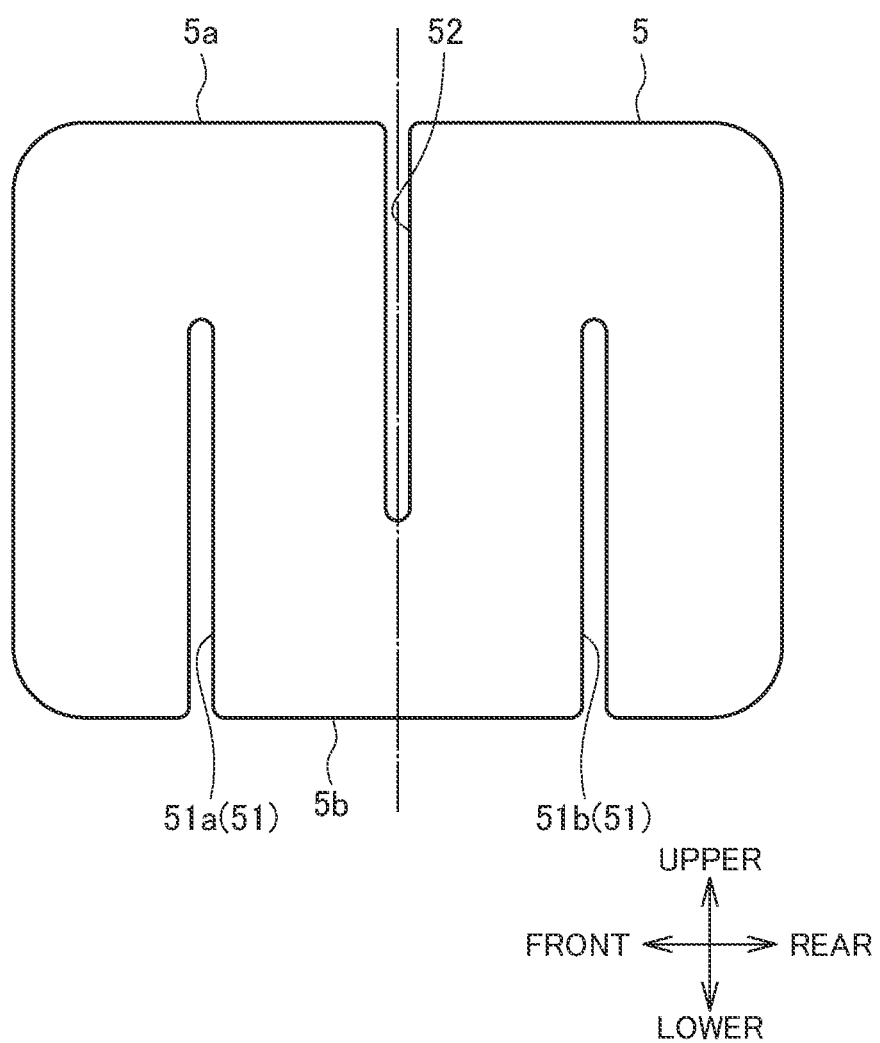
FIG. 4 is a plan view illustrating a double-sided adhesive tape 5 used for attaching the base 3 to the windshield 81.

As illustrated in FIG. 4, the double-sided adhesive tape 5 is formed into a shape corresponding to the outline of the base 3. The double-sided adhesive tape 5 in this example has a rectangular shape. The double-sided adhesive tape 5 is not thick with a thickness of about 1 mm, for example.

The double-sided adhesive tape 5 has a slit 52 extending from a side 5a that is an upper edge, and slits 51 extending from a side 5b that is a lower edge, in the state in which one of the surfaces is stuck on the base 3 in the attached state of the drive recorder 91.

The slits 51 in this example are provided more than the slit 52, and include the two slits 51a and 51b.

The double-sided adhesive tape 5 has adhesive force sufficient to be tightly stuck on the attachment surface 3a of the base 3 not only in its natural state but also in the state in which the right and left edges of the attachment surface 3a are bent and deformed in the thickness direction.

Figure 5A:
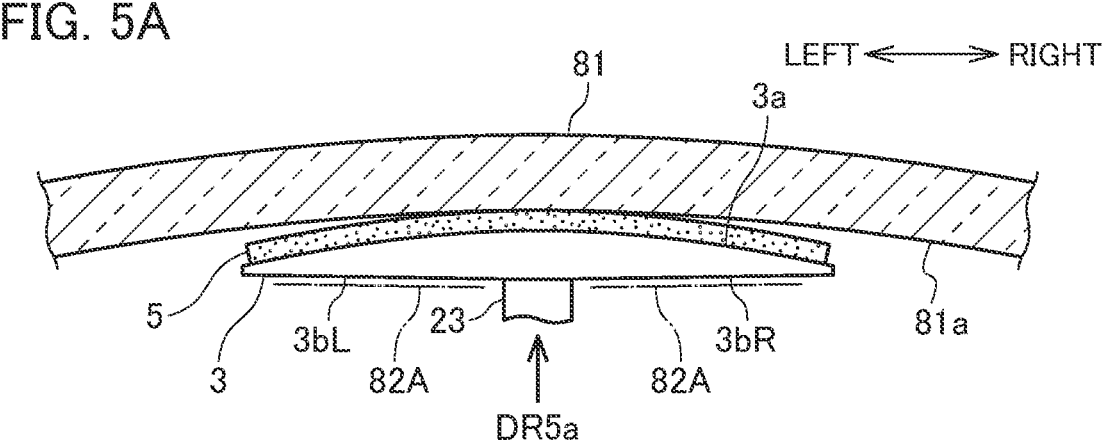
FIGS. 5A to 5C is a view showing a first operation for explaining the operation of attaching the base 3 to the windshield 81.
Figure 5B:
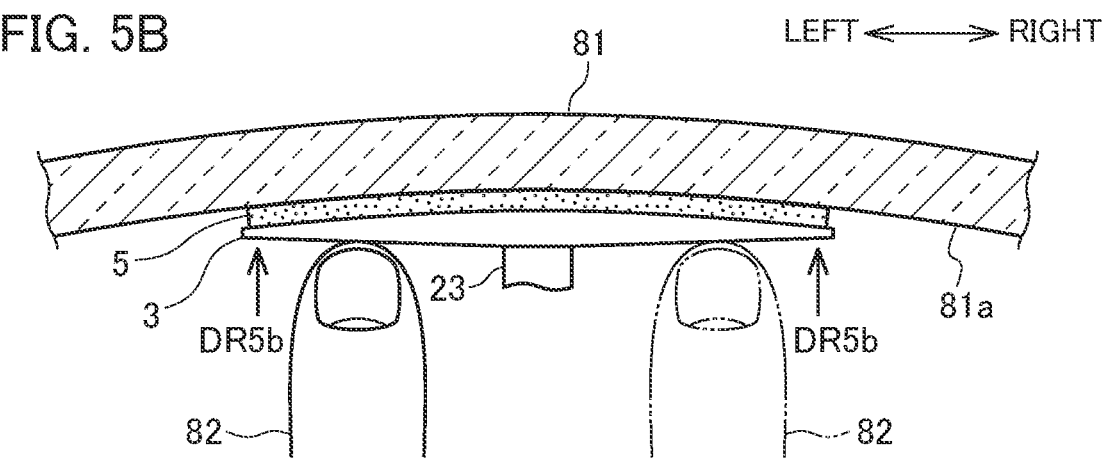
Figure 5C:
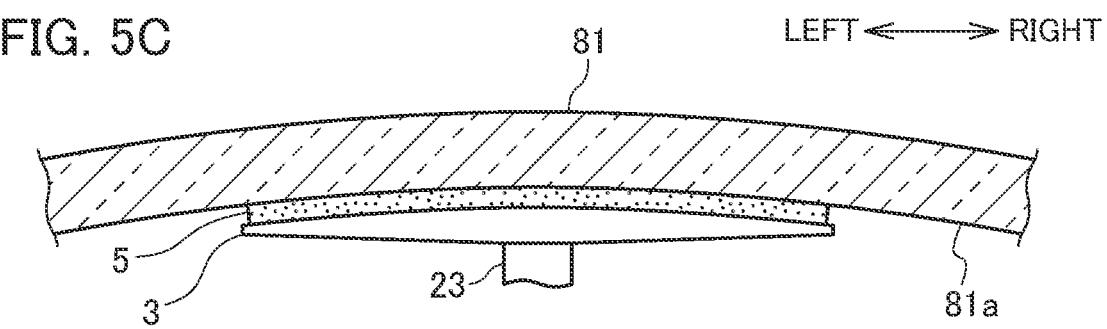

FIG. 5A to FIG. 5C are views showing a first operation that is part of operation of attaching the base 3 of the drive recorder 91 to the windshield 81.

This example is illustrated with a case in which the radius Ra of the attachment surface 3a of the base 3 is different from and slightly smaller than the radius of curvature in the right-left direction at the part on the inner surface 81a of the windshield 81 to which the drive recorder 91 is attached.

When the drive recorder 91 is attached to the windshield 81, the middle part of the base 3 in the right-left direction is first pressed against the windshield 81 in the state in which one of the surfaces of the double-sided adhesive tape 5 is stuck on the attachment surface 3a so as to stick the other surface of the double-sided adhesive tape 5 to the windshield 81, as illustrated in FIG. 5A.

Then, as illustrated in FIG. 5B, the respective inclination surfaces 3bL and 3bR are pressed by the fingers 82 against the windshield 81.

As illustrated in FIG. 2, the regions pressed by the fingers in the base 3 are defined as pressed regions 82A indicated by the dash-dotted lines. The drive recorder 91 also has a shape that allows the tips of the fingers to reach the pressed regions 82A.

The press of the pressed regions 82A by the fingers causes the respective inclination surfaces 3bL and 3bR having flexibility to be deformed together with the double-sided adhesive tape 5 so as to conform to the curvature of the inner surface 81a of the windshield 81.

The base 3 and the windshield 81 thus tightly adhere to each other via the double-sided adhesive tape 5 along the entire region from the middle part to the circumferential edge of the attachment surface 3a, as illustrated in FIG. 5C.

When the radius Ra of the attachment surface 3a is greater than the radius of curvature of the inner surface 81a of the windshield 81, the edges on both sides of the base 3 in the right-left direction are first stuck on the windshield 81, and the middle part in which the pillar part 23 is provided is then pressed against the windshield 81.

This causes the respective inclination surfaces 3bL and 3bR having flexibility to be deformed together with the double-sided adhesive tape 5 so as to conform to the curvature of the inner surface 81a of the windshield 81. The base 3 and the windshield 81 in this case also tightly adhere to each other via the double-sided adhesive tape 5 along the entire region from the middle part to the circumferential edge of the attachment surface 3a, as illustrated in FIG. 5C.

As described above, the base 3 has flexibility in the thickness direction at the parts extending in the respective right and left directions from the pillar part 23. The base 3 thus can be deformed along substantially the entire surface from the middle part to the edges so as to conform to the curvature of the inner surface 81a of the windshield 81. This enables substantially the entire attachment surface 3a of the base 3 to be stuck on the windshield 81 via the double-sided adhesive tape 5.

The attachment surface 3a of the base 3 is curved to project in the middle having the radius Ra substantially corresponding to the inner surface 81a of the windshield 81.

The deformed amount of the base 3 upon the attachment to the windshield 81 via the double-sided adhesive tape 5 is thus small, and the force acting in the direction of removing the base 3 after being attached is also small.

The configuration described above enables attach the drive recorder 91 to the windshield 81 with the high attachment strength, so as to keep the stable fixation to the windshield 81 for a long period of time accordingly.

When the base 3 is formed of resin by injection molding, a recess called a sink mark could be caused during the injection molding at a part on the attachment surface 3a corresponding to the pillar part 23 due to the influence of resin flow on the pillar part 23 in which the amount of resin to be used is large.

Providing the attachment surface 3a with the thick projecting middle part corresponding to the pillar part 23 can reduce the influence on the curved shape of the attachment surface 3a if a recess called a sink mark is caused, so as to keep the fine curved shape of the entire attachment surface 3a accordingly.

The attachment of the drive recorder 91 to the windshield 81 is made by a lower-side rotational mounting method in the application to automobiles, for example, as described below with reference to FIG. 6 and FIG. 7.

Figure 6:
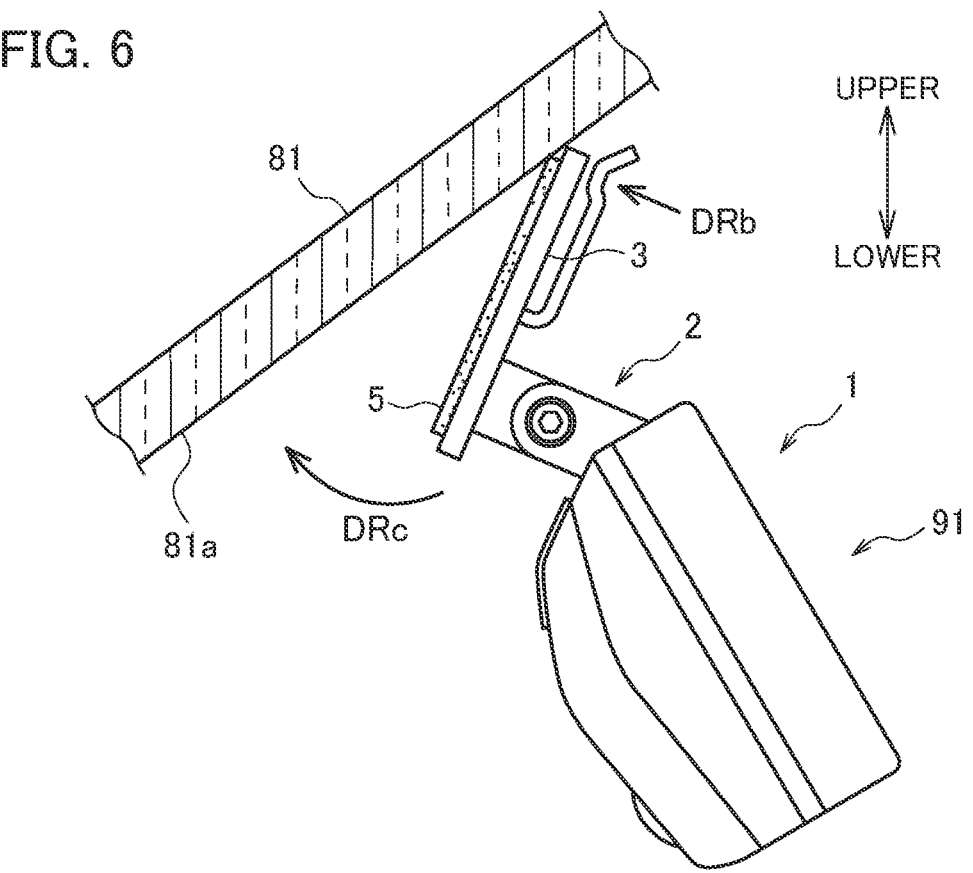
FIG. 6 is a view showing a second operation for explaining a first attachment direction in which the drive recorder 91 is attached to the windshield 81.

The lower-side rotational mounting method illustrated in FIG. 6 positions and presses the upper end part of the base 3 against the windshield 81 (indicated by the arrow DRb), and rotates the lower side of the base 3 about the pressed part used as a fulcrum (indicated by the arrow DRc).

This method is applied to vehicles such as automobiles in which the operator can operate at a position close to the position of the windshield 81 at which the drive recorder 91 is attached and can easily recognize the upper end part of the attachment position.

Figure 7:
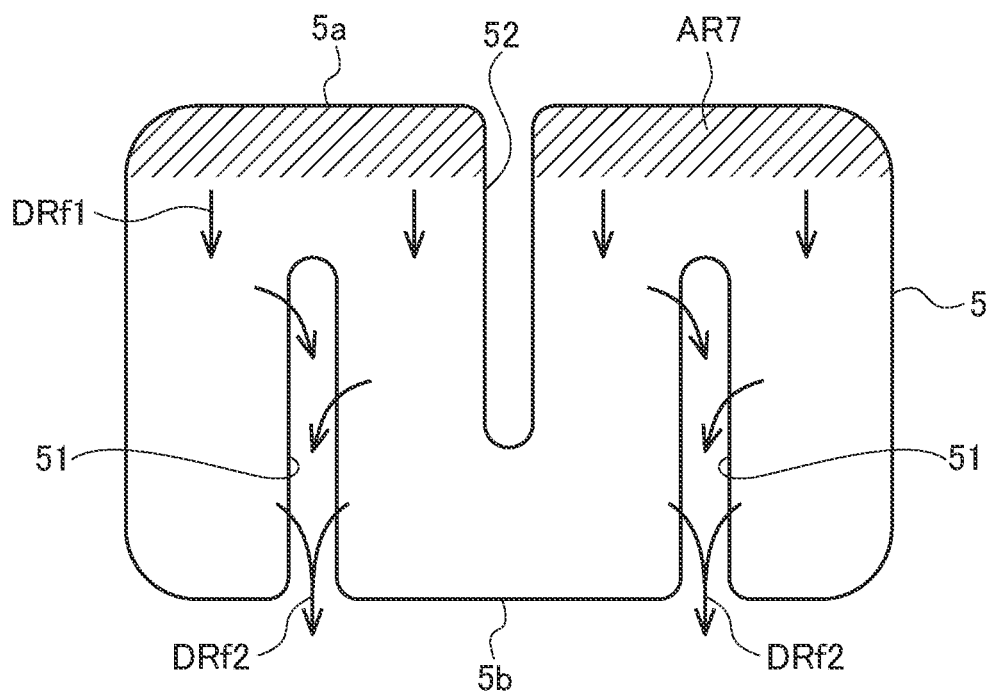
FIG. 7 is a plan view illustrating a state of air release in the first attachment direction.

This method first sticks an upper end region AR7 (indicated by the hatching) along the side 5a that is the upper edge of the double-sided adhesive tape 5, and then gradually extends the stuck range downward as indicated by the arrows DRf1 in association with the rotation of the base 3, as illustrated in FIG. 7.

The operation of extending the stuck range needs to release air bubbles that would be enclosed between the double-sided adhesive tape 5 and the windshield 81 sufficiently to the outside.

The double-sided adhesive tape 5 used for the drive recorder 91 is provided with the slits 51 open toward the side 5b that is the lower edge, as illustrated in FIG. 7.

The provision of the slits 51 can release most of the air bubbles that would be enclosed between the double-sided adhesive tape 5 and the windshield 81 to the outside through the slits 51 (indicated by the arrows DRf2) in association with the downward extension of the stuck range by the time of completion of the entire sticking, so as to reliably ensure the high attachment strength without a decrease in the stuck area caused by the air bubbles.

Figure 8:
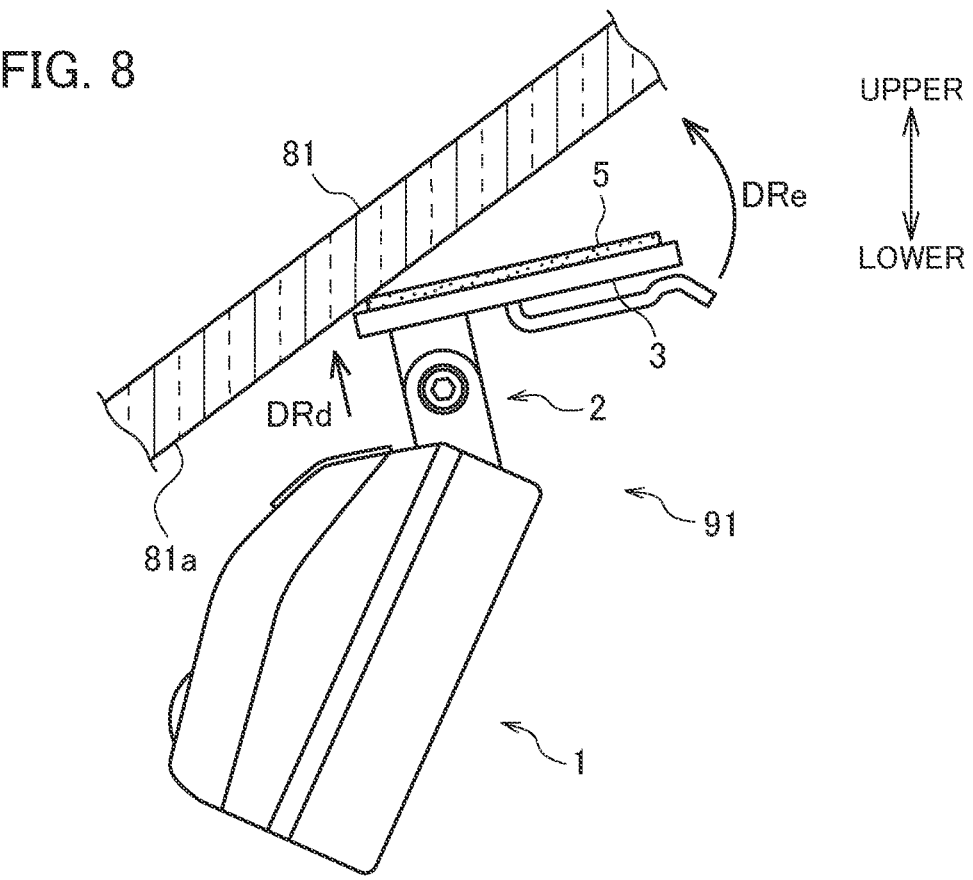
FIG. 8 is a view showing a third operation for explaining a second attachment direction in which the drive recorder 91 is attached to the windshield 81.

An upper-side rotational mounting method illustrated in FIG. 8 positions and presses the lower end part of the base 3 against the windshield 81 (indicated by the arrow DRd), and rotates the upper side of the base 3 about the pressed part used as a fulcrum (indicated by the arrow Dre).

This method is typically applied to commercial vehicles such as trucks in which the roof of the driver's seat is high and the operator is distant from the upper end of the windshield 81, which impedes the recognition of the upper end of the attachment position.

Figure 9:
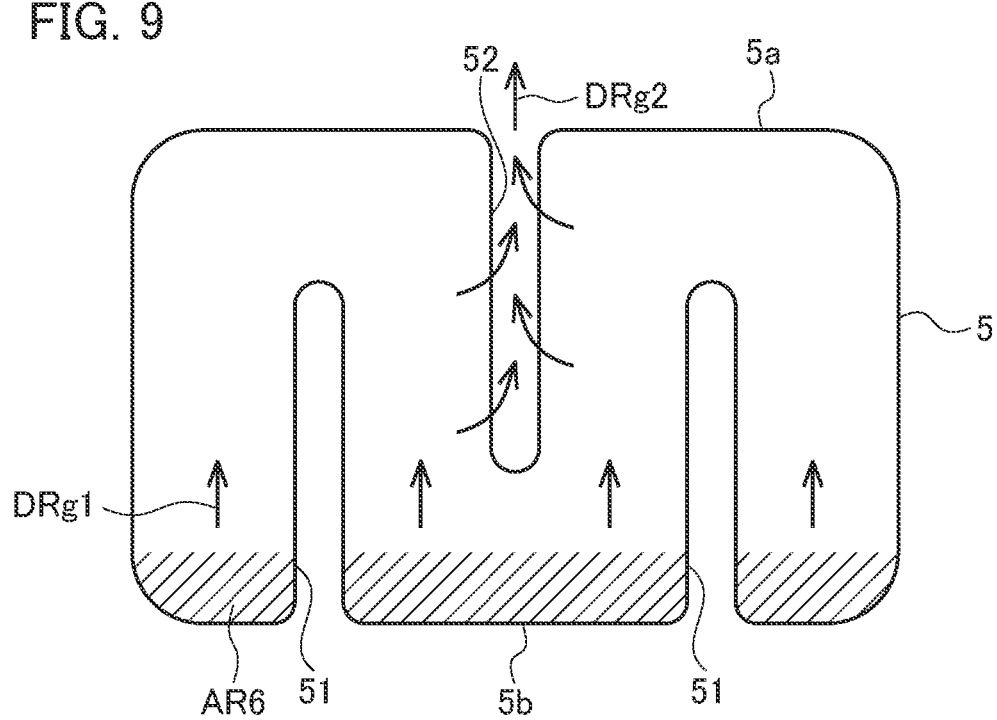
FIG. 9 is a plan view illustrating a state of air release in the second attachment direction.

This method first sticks a lower end region AR6 (indicated by the hatching) along the side 5b that is the lower edge of the double-sided adhesive tape 5, and then Gradually extends the stuck range upward as indicated by the arrows DRg1 association with the rotation of the base 3, as illustrated in FIG. 9.

The operation of extending the stuck range in this case also needs to release air bubbles that would be enclosed between the double-sided adhesive tape 5 and the windshield 81 sufficiently to the outside.

The double-sided adhesive tape 5 used for the drive recorder 91 is provided with the slit 52 open toward the side 5a that is the upper edge, as illustrated in FIG. 9.

The provision of the slit 52 can release most of the air bubbles that would be enclosed between the double-sided adhesive tape 5 and the windshield 81 to the outside through the slit 52 (indicated by the arrows DRg2) in association with the upward extension of the stuck range by the time of completion of the entire sticking, so as to reliably ensure the high attachment strength without a decrease in the stuck area caused by the air bubbles.

When the drive recorder 91 is on the market in automobiles in which the ceiling over the driver's seat is relatively low, the slits 51 open downward are preferably provided more than the slit 52 open upward, as illustrated in FIG. 7 and FIG. 9.

As described above, according to the present embodiment can ensure the high attachment strength while avoiding an increase in cost of the double-sided adhesive tape 5.

Figure 11:
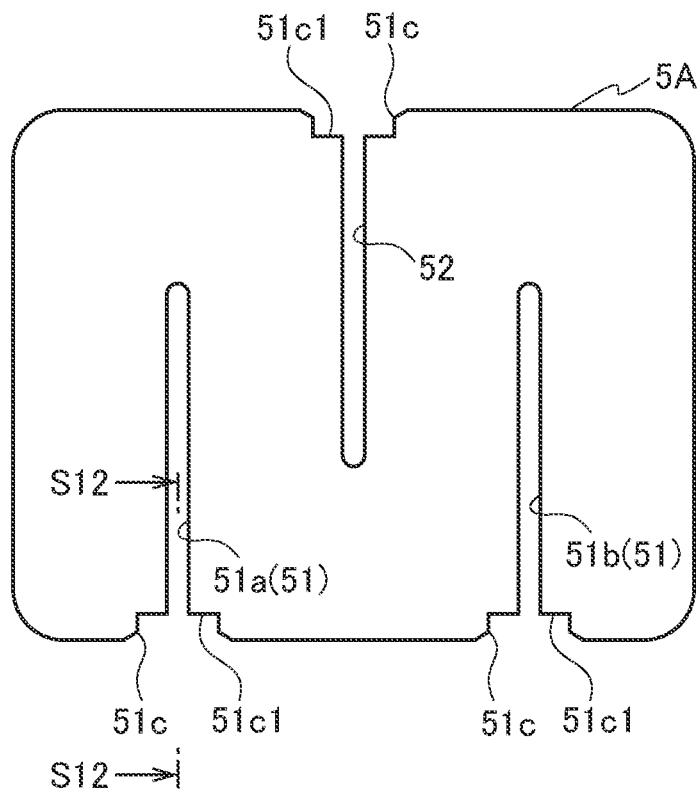
FIG. 11 is a plan view illustrating a double-sided adhesive tape 5A according to an example.

The double-sided adhesive tape is preferably a double-sided adhesive tape 5A as illustrated in FIG. 11. The double-sided adhesive tape 5A differs from the double-sided adhesive tape 5 in being provided with guide parts 51c cut into a substantially rectangular shape having a wider width than the respective slits 51 and 52 at the openings of the respective slits 51 and 52. The width of the guide parts 51c is set to a degree allowing a flathead screwdriver 83 (refer to FIG. 12) to be inserted to the gap. A depth of the guide parts 51c is set to a degree such that a back edge part 51c1 is located on the inner side of an outer circumferential part 3d of the base 3 when the double-sided adhesive tape 5A is stuck on the base 3, as illustrated in FIG. 12.

Figure 12:
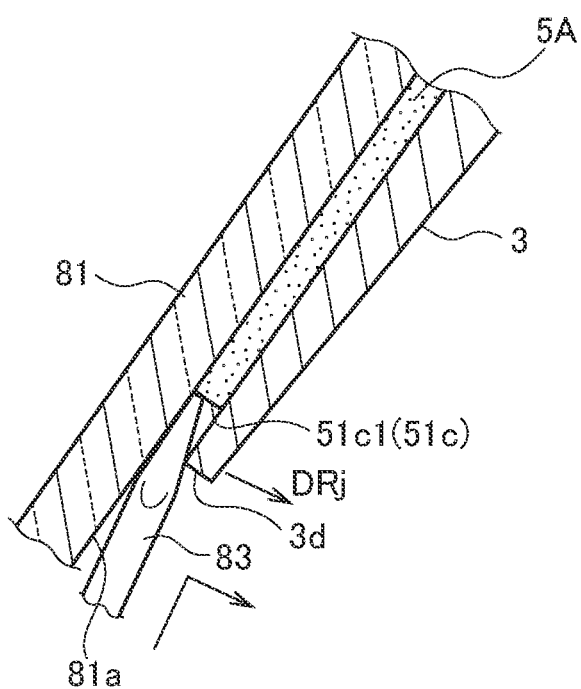
FIG. 12 is a cross-sectional view taken along line S12-S12 in FIG. 11 for explaining an operation of removing the double-sided adhesive tape 5A according to the example.

The structure of the double-sided adhesive tape 5A stuck on the inner surface 81a of the windshield 81 thus can allow the tip of the flathead screwdriver 83 to be inserted to the guide parts 51c, as illustrated in FIG. 12. The tip of the flathead screwdriver 83, when inserted to the guide part 51c, is regulated in the width direction by the guide part 51c so as to lead the inserted position to be stable, and the outer circumferential part 3d of the base 3 can be directly removed in a direction separated from the windshield 81 (indicated by the arrow DRj) when the flathead screwdriver 83 is lifted up. The use of the double-sided adhesive tape 5A thus facilitates the removal of the drive recorder 91 attached to the windshield 81.

The guide parts 51c are provided at the openings toward the edges of the respective slits 51 and 52. This configuration can suppress a decrease in the stuck area of the double-sided adhesive tape 5A derived from the provision of the guide parts 51c, namely, a reduction in the adhesive force of the double-sided adhesive tape 5A, to a substantially ignorable level.

It should be understood that the above embodiment is not intended to be limited to the configurations described above, and various modified examples may be applied without departing from the scope of the present disclosure.

The base 3 is formed to have a smaller thickness (to be thinner) as being separated from the pillar part 23, so that the parts (corresponding to the inclination surfaces 3bL and 3R) extending in the respective right and left directions from the pillar part 23 can be bent in the thickness direction.

These characteristics can also be applied to a case of including a plurality of pillar parts 23.

Figure 10:
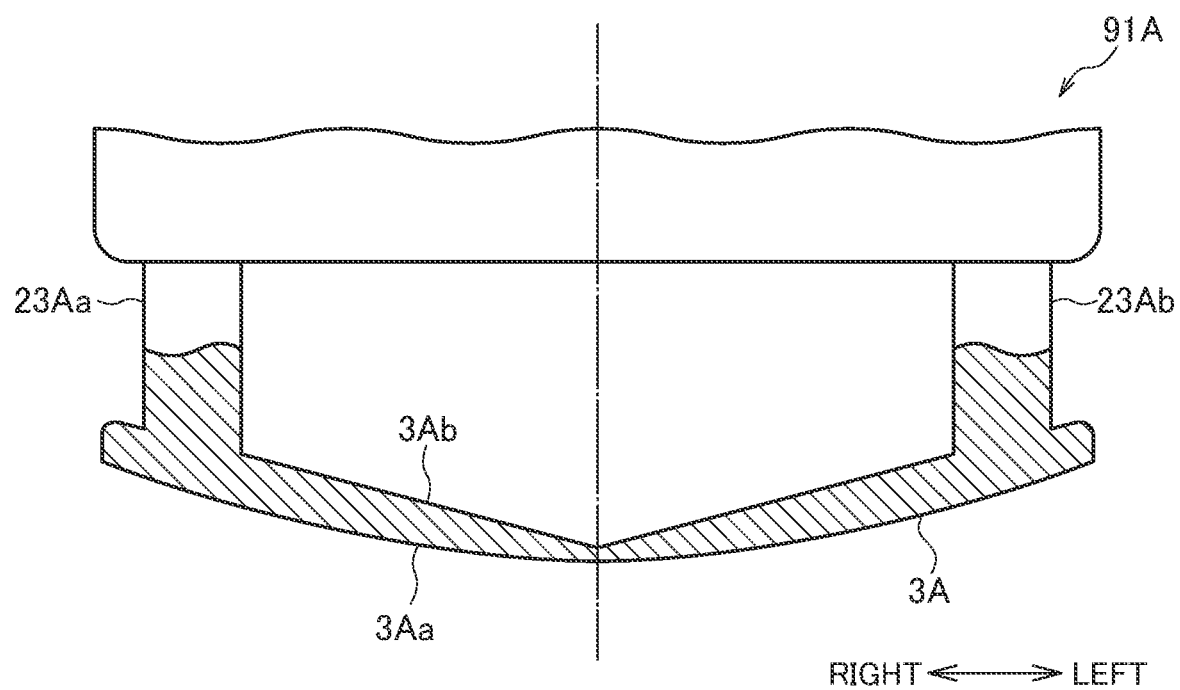
FIG. 10 is a partial cross-sectional view illustrating a base 3A of a drive recorder 91A according to a modified example.

In particular, as illustrated in FIG. 10, an attachment surface 3Aa of a drive recorder 91A including a base 3A provided with plural pillar parts 23Aa and 23Ab is a curved surface projecting most in the middle in the right-left direction, as in the case of the attachment surface 3a. An inclination surface 3Ab provided with the pillar parts 23Aa and 23Ab is a surface gently inclined into a V-shape so that the middle part between the respective pillar parts 23Aa and 23Ab has the smallest thickness toward the attachment surface 3Aa.

While the example of the onboard device is illustrated with the drive recorder 91, the onboard device is not limited to the drive recorder 91. The onboard device may be a car navigation device, for example.

The glass member to which the onboard device is attached is illustrated with the windshield on the front side of the vehicle, but is not limited to this case. The glass member may be any of windshields on the front side, on the rear side, and on the lateral sides. The glass member includes inorganic glass and resin glass.

What is claimed is:

1. An onboard device comprising:
a body member;
a support member projecting from the body member and including a base to be attached to a concave inner surface of a glass member having a curved shape provided in a vehicle; and
a double-sided adhesive tape prepared to be stuck on the base,
wherein the base of the support member is a plate-like member including an attachment surface to be opposed to the inner surface of the glass member and a pillar-part formation surface provided with a pillar part connected to the body member on an opposite side of the attachment surface,
the attachment surface is a curved surface having a curvature at least in a first direction along the attachment, surface and projecting toward an opposite side of the pillar-part formation surface,
the double-sided adhesive tape is provided with a plurality of slits including at least one first slit open toward an upper edge located on an upper side when the base is attached to the inner surface and cut downward in a direction perpendicular to an axial line about which the base is rotated when attached to the inner surface, and at least one second slit open toward a lower edge located on a lower side and cut upward in the direction perpendicular to the axial line about which the base is rotated when attached to the inner surface, and
wherein the double-sided adhesive tape is provided with guide parts at openings at the upper edge and the lower edge of the at least one first slit and the at least one second slit, each guide part having a greater width than the at least one first slit and the at least one second slit.

2. The onboard device according to claim 1, wherein the double-sided adhesive tape has a structure in which a lower end of the at least one first slit is located below an upper end of the at least one second slit.

3. The onboard device according to claim 1, wherein the at least one second slit comprises a plurality of second slits, and the double-sided adhesive tape is provided with the second slits more than the at least one first slit.

4. The onboard device according to claim 1, wherein a thickness of the base is decreased as the base is separated from the pillar part in the first direction.

5. The onboard device according to claim 1, wherein the pillar-part formation surface is an inclined surface inclined in a direction toward the attachment surface with respect to a plane surface perpendicular to an axial direction of the pillar part as the pillar-part formation surface is separated from the pillar part in the first direction.

6. The onboard device according to claim 1, wherein, when the base is stuck on the inner surface of the glass member via the double-sided adhesive tape, adhesion between the base and the glass member is ensured due to the double-sided adhesive tape interposed therebetween in a state in which the base is pressed by a finger in a thickness direction so as to be bent in a direction in which a first radius of curvature of the inner surface of the glass member in the first direction conforms to a second radius of curvature of the attachment surface in the first direction when the first radius of curvature is different from the second radius of curvature.

7. The onboard device according to claim 1, wherein a back edge part of the respective guide parts is located on an inner side of an outer circumferential part of the base.

8. The onboard device according to claim 1, being a drive recorder comprising a camera unit configured to capture an image through the glass member in a state in which the support member is attached to the glass member, and a display unit configured to display the image captured by the camera unit.

9. An attachment structure for an onboard device comprising:
a body member;
a support member projecting from the body member and including a base to be attached to a concave inner surface of a glass member having a curved shape provided in a vehicle; and
a double-sided adhesive tape prepared to be stuck on the base and the inner surface so as to attach the support member to the glass member,
wherein the double-sided adhesive tape is provided with a plurality of slits including at least one first slit open toward an upper edge located on an upper side when the base is attached to the inner surface and cut downward in a direction perpendicular to an axial line about which the base is rotated when attached to the inner surface, and at least one second slit open toward a lower edge located on a lower side and cut upward in the direction perpendicular to the axial line about which the base is rotated when attached to the inner surface, and
wherein the double-sided adhesive tape is provided with guide parts at openings at the upper edge and the lower edge of the at least one first slit and the at least one second slit, each guide part having a greater width than the at least one first slit and the at least one second slit.

10. The attachment structure for the onboard device according to claim 9, wherein the at least one second slit comprises a plurality of second slits, and the double-sided adhesive tape is provided with the second slits more than the at least one first slit.

* * * * *